Nov. 19, 1968

T. O. MUMPER 3,412,195

INTERMEDIATE FURNACE BARRIER

Filed Aug. 5, 1965

INVENTOR
THOMAS O. MUMPER

BY
Cushman, Darby & Cushman
ATTORNEYS

United States Patent Office 3,412,195
Patented Nov. 19, 1968

3,412,195
INTERMEDIATE FURNACE BARRIER
Thomas O. Mumper, Wilmington, Del., assignor to Haveg Industries, Inc., Wilmington, Del., a corporation of Delaware
Filed Aug. 5, 1965, Ser. No. 477,460
6 Claims. (Cl. 13—27)

ABSTRACT OF THE DISCLOSURE

A metallurgical furnace wall construction, which protects against inadvertent discharge of molten metal, is disclosed, wherein a high silica fabric layer is inserted between the crucible and the induction coil refractory support.

---

Figure 1:
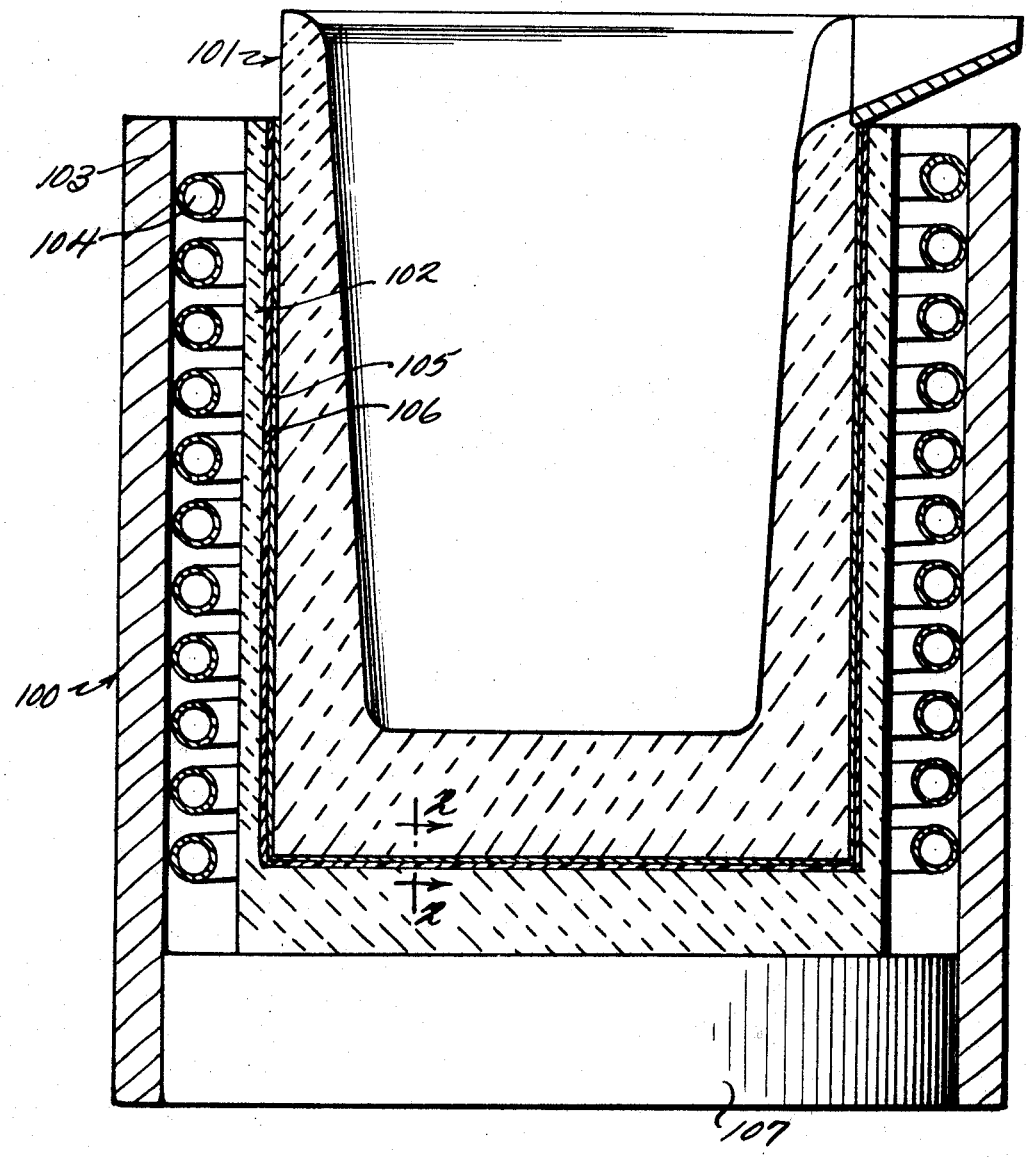

This invention is concerned with high silica fabric intermediate barriers for metallurgical furnaces, and more specifically with high silica fabric intermediate barrier layers for coreless induction melting furnaces.

Metallurgical furnaces in general have had a problem existing with leakage or spillage of molten metals which escape the furnaces through cracks in the refractory furnace wall. This problem has been general to metallurgical furnaces whether heating is by electricity, gas or flame, with heat transfer by induction, convection or radiation, especially where the charge is poured out at frequent intervals, resulting in expansion-contraction problems in the refractory lining of the vessel holding the melt. In the past, frequent relining of the melt vessel has been required. While the high silica fabric intermediate barrier layer of this invention may be used with any of the various types of metallurgical furnaces, the preferred use is in conjunction with a coreless induction melting furnace and the description of the invention will be in terms of such use.

Extensive use is being made at the present time of coreless electrical induction furnaces operating in the low frequency range for melting metals and alloys. Generally, such a furnace has no iron core inside or interthreading the inductor coil, although in many instances there will be iron yokes in the area surrounding the inductor coil and beneath the inductor coil. The inductor coil cannot be outside a steel shell or iron core or the shell or core itself will be heated. Unlike the submerged channel core type electric induction furnaces, the coreless furnace operates on a single mass of metal in a pot-like container.

One of the limitations of the coreless electrical induction furnace is that there must be good coupling between the charge and the inductor coil. Because of this limitation the side walls of the refractory lining between the electric inductor coil and the molten metal must be thin, and in most coreless electrical induction furnaces the thickness of the side walls ranges between 3 and 5 inches. Such thin-walled coreless electrical induction furnaces have frequently failed in the past due to a crack forming in the sintered lining, allowing the molten metal to reach the water cooled primary coil. Also, considerable difficulty has been encountered through cracking of the refractory and discharging the molten metal contents on the floor or into the furnace pit so as to create a source of grave danger to workmen, cause a fire hazard, damage adjoining equipment and suddenly interrupt furnace operation.

Briefly, the instant invention provides a high silica fabric intermediate barrier layer between the furnace lining and the induction coil whereby all molten metal leakages are contained inside of the barrier layer. This invention also contemplates a layer of high silica fabric covering the bottom of the furnace lining and overlapping the side barrier layer whereby the furnace lining is completely surrounded by the intermediate barrier layers.

It is an object of this invention to provide an intermediate barrier layer for metallurgical furnaces.

It is another object of this invention to provide an intermediate barrier layer for coreless electrical induction furnaces.

It is a further object of this invention to provide a high silica fabric intermediate barrier layer for metallurgical furnaces.

It is an additional object of this invention to provide a high silica fabric intermediate barrier layer for coreless electrical induction furnaces.

It is a further object of this invention to provide an intermediate barrier layer which is between the refractory lining of a coreless electrical induction furnace and the inductor coil whereby any molten metal escaping through a crack in the refractory lining will be contained before it reaches the inductor coil.

The drawings illustrate only a few of the wide variety of the embodiments of the invention.

Figure 2:
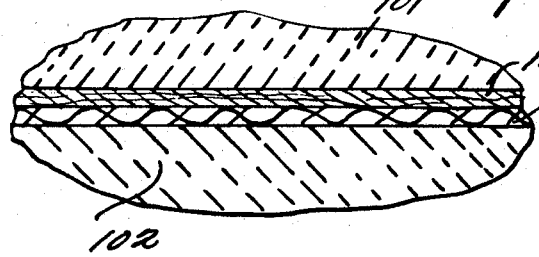

FIGURE 1 is a vertical elevational section of a furnace with the intermediate barrier layer of this invention; and FIGURE 2 is a view, taken along line 2—2, of a section of the furnace of FIGURE 1, showing the intermediate barrier layer more clearly.

In general, an induction furnace contains a crucible, built-in or removable, formed of refractory packed about an induction coil of, for instance, high conductivity copper. The coil in turn is supported by insulated structural members made, for example, of Transite or maple. Generally the induction coil is water-cooled.

Specifically, the coreless induction furnace 100 of FIGURE 1 consists of a crucible 101 made of refractory materials. The crucible is surrounded by a brick support layer 102, outside of which are water cooled induction coils 104. These induction coils are in turn surrounded by and supported by an outer shell of structural members 103. The furnace rests on a base 107, which may be a pigging block of refractory material.

High silica fabric layer 106 is installed between the coil refractory, or brick support layer, 102 and a sheet of asbestos paper 105, against which is rammed the inner refractory lining 101. The silica fabric covers the entire wall area with adequate overlap to insure a total barrier. Commercial sodium silicate paste or other compatible adhesive may be used to hold the fabric in place during assembly. The high silica fabric and asbestos layers also cover the bottom portion of the refractory vessel, overlapping the side layers.

The intermediate barrier layers are more clearly seen in FIGURE 2, wherein the reference numerals have the same significance as in FIGURE 1.

While most high silica fabrics may be used as metallurgical furnace intermediate barriers, the preferred high silica cloth has a weight of 38.5 oz. per square yard and a 12-H satin weave.

The preferred high silica fabrics have a sodium carbonate silica content of at least 90%, preferably at least 92% and a total silica content of at least 90%, preferably at least 95% as shown for example in Moore patent, No. 2,995,803.

OPERATION

During normal operation of coreless induction melting furnaces, cracks or fissures appear in the inner lining as a result of repeated heating and cooling. It is quite common at the present time for molten metal to reach the water-cooled induction coil, constructed from copper tubing. When the molten metal does reach the induction coil, the water-cooled tubing can be ruptured, introducing water to the molten metal. Steam and instantaneous pressure development can cause a major explosion, endangering personnel and damaging expensive equipment. Even if the water-cooled induction coil is not ruptured it may be seriously damaged, requiring expensive repair or replacement.

The silica fabric barrier of this invention prevents contact between molten metal and the induction coil. The silica fabric totally stops the flow of molten metal, causing solidification in an area safely removed from the induction coil.

The high silica fabric intermediate barrier of this invention also acts as a warning of refractory lining leakage before such leakage can cause serious damage. A sudden, substantial change in electrical characteristics, particularly power factor, acts as a signal that molten metal has reached and has been contained by the silica fabric intermediate barrier. Thus, the intermediate barrier of this invention contains all molten metal leakages while the escaping metal itself sets up a warning change in electrical characteristics, allowing early repair of any refractory lining fissures.

The present invention is unique in the degree of protection afforded by a very thin barrier against penentration by molten metals. Also unique is the flexibility of the high silica cloth as compared with conventional refractories (even asbestos paper or cloth is brittle, and is not very flexible). The high silica cloth furthermore retains its flexibility properties at much higher temperatures, i.e., 2000° F. and higher, than asbestos can tolerate (about 1000° F.).

While the use of an asbestos paper layer is shown in the drawings and is preferred, this can be omitted.

I claim:

1. In a metallurgical furnace comprising a refractory melt vessel, an induction coil refractory support mounted outside of said melt vessel, an induction coil heating means mounted and outside of said support, the improvement comprising a layer of high silica fabric located between said refractory melt vessel and said induction coil refractory support whereby liquid metals in said melt vessel are contained within said high silica fabric layer in the event of a fissure developing in said melt vessel.

2. A coreless electrical induction furnace comprising refractory vessel means to hold molten metal, high silica fabric barrier means to contain molten metal leakage from said refractory vessel means, induction coil means located outside of said refractory vessel means to heat metal in said refractory vessel means, and refractory support means located inside said coil means for supporting said induction coil means and said vessel means, said high silica fabric barrier means located between said refractory support means and said refractory vessel means.

3. A metallurgical furnace wall comprising an inner refractory crucible layer, and an outer induction coil support refractory layer, an electrical induction coil outside of said outer induction coil support refractory layer, and, intermediate said refractory layers, a high silica fabric layer.

4. A metallurgical furnace wall comprising an inner refractory coil layer, and outer induction coil support refractory layer, and, intermediate said refractory layers, a high silica fabric layer, and a layer of asbestos paper interposed between said refractory coil layer and said high silica fabric layer.

5. In a metallurgical furnace comprising a refractory melt vessel, an induction coil refractory support mounted outside of said melt vessel, and an induction coil heating means mounted on said support, the improvement comprising a layer of high silica fabric located between said refractory melt vessel and said induction coil refractory support, and a layer of asbestos paper located between said high silica fabric layer and said refractory melt vessel, whereby liquid metals in said melt vessel are contained within the said high silica fabric layer in the event of a fissure developing in said melt vessel.

6. A coreless electrical induction furnace comprising refractory vessel means to hold molten metal leakage from said refractory vessel means, induction coil means located outside of said refractory vessels means to heat metal in said refractory vessel means, refractory support means for supporting said induction coil means and said vessel means, said high silica fabric barrier means located between said refractory support means and said refractory vessel means, and a layer of asbestos paper located between said refractory vessel means and said high silica fabric barrier means.

References Cited

UNITED STATES PATENTS

| 2,286,481 | 6/1942 | Fisher | 13—27 |
| 2,824,794 | 2/1958 | Hathaway | 13—27 X |
| 3,227,431 | 1/1966 | Steeves | 13—27 X |

FOREIGN PATENTS

| 937,213 | 9/1963 | Great Britain. |

RICHARD M. WOOD, Primary Examiner.

L. H. BENDER, Assistant Examiner.